US008613072B2

(12) United States Patent
Nice et al.

(10) Patent No.: US 8,613,072 B2
(45) Date of Patent: Dec. 17, 2013

(54) REDIRECTION OF SECURE DATA CONNECTION REQUESTS

(75) Inventors: Nir Nice, Kfar Vradim (IL); Benjamin M. Schultz, Kirkland, WA (US); Narasimhan A. Venkataramaiah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 12/393,046

(22) Filed: Feb. 26, 2009

(65) Prior Publication Data

US 2010/0218248 A1 Aug. 26, 2010

(51) Int. Cl.
*H04L 29/06* (2006.01)

(52) U.S. Cl.
USPC .......................... 726/12; 709/228

(58) Field of Classification Search
USPC .......................... 726/12; 709/228
See application file for complete search history.

(56) References Cited

U.S. PATENT DOCUMENTS

| | | | |
|---|---|---|---|
| 6,081,900 A | 6/2000 | Subramaniam et al. | |
| 6,138,162 A | 10/2000 | Pistriotto et al. | |
| 6,185,619 B1 | 2/2001 | Joffe et al. | |
| 6,360,262 B1 | 3/2002 | Guenthner et al. | |
| 6,735,631 B1 | 5/2004 | Oehrke et al. | |
| 6,754,709 B1 | 6/2004 | Gbadegesin | |
| 7,016,958 B1 | 3/2006 | Aviani et al. | |
| 7,136,383 B1* | 11/2006 | Wilson | 370/392 |
| 7,143,195 B2 | 11/2006 | Vange et al. | |
| 7,463,637 B2* | 12/2008 | Bou-Diab et al. | 370/401 |
| 2001/0013067 A1* | 8/2001 | Koyanagi et al. | 709/230 |
| 2002/0147757 A1* | 10/2002 | Day et al. | 709/1 |
| 2003/0061353 A1* | 3/2003 | Johnson et al. | 709/226 |
| 2003/0142660 A1* | 7/2003 | Nishimura et al. | 370/351 |
| 2004/0006615 A1* | 1/2004 | Jackson | 709/223 |
| 2004/0120260 A1 | 6/2004 | Bernier et al. | |
| 2005/0190769 A1 | 9/2005 | Smith | |
| 2006/0221955 A1 | 10/2006 | Enright | |
| 2006/0236378 A1 | 10/2006 | Burshan | |
| 2006/0248581 A1 | 11/2006 | Sundarrajan et al. | |
| 2008/0077788 A1* | 3/2008 | Jain et al. | 713/151 |
| 2008/0178273 A1 | 7/2008 | Weber | |
| 2008/0281754 A1 | 11/2008 | Kelley et al. | |

FOREIGN PATENT DOCUMENTS

KR 100759489 B1 9/2007

OTHER PUBLICATIONS

"International Search Report and Written Opinion" from the International Searching Authority (ISA/KR) for International Application No. PCT/US2010/023257, Date Mailed: Sep. 28, 2010, International Filing Date: Feb. 5, 2010, pp. 9.

Notice on the First Office Action received from the State Intellectual Property Office of the Peoples's Republic of China, dated Aug. 15, 2012, 10 pages.

(Continued)

*Primary Examiner* — Kambiz Zand
*Assistant Examiner* — Michael Guirguis
(74) *Attorney, Agent, or Firm* — Toler Law Group, PC

(57) ABSTRACT

Methods, systems, and computer-readable media are disclosed for processing a secure data connection request. A particular method receives, at a first gateway, a secure data connection request from a client identifying a server to connect to. The first gateway sends the client device a redirect message instructing the client device to attempt alternate connection via a second gateway. The client sends a secure data connection request to the second gateway and the second gateway facilitates the secure data connection between the client and the server.

20 Claims, 9 Drawing Sheets

(56) References Cited

OTHER PUBLICATIONS

"Enhancing Application Awareness for More Services", retrieved at <<http://www.cisco.com/en/US/solutions/collateral/ns341/ns525/ns537/ns549/net_implementation_white_paper0900aecd80590c00.html>>, Dec. 11, 2008, pp. 1-6.

"Intelligent Application Gateway 2007", retrieved at <<http://download.microsoft.com/download/F/0/2/F0229C11-B47E-4002-A444-60207C6E11F5/IAG2007Datasheet-main.pdf>>, pp. 8, Jan. 11, 2007.

"Routes, Equal Cost Multipath Routing, Policy Routing", retrieved at <<http://www.mikrotik.com/testdocs/ros/2.9/ip/route.php>>, Dec. 11, 2008, pp. 1-7.

Chappell Laura, "Routing Sequences for ICMP: Using ICMP to Troubleshoot the Network", retrieved at <<http://support.novell.com/techcenter/articles/nc2001_03a.html>>, Mar. 1, 2001, pp. 1-3.

"Load Balancing", retrieved at <<http://www.checkpoint.com/services/education/training/courses/samples/MAN2_C04_Load_Balancing.pdf>>, pp. 85-92, 2004.

Davies, Joseph, "The Secure Socket Tunneling Protocol", retrieved at <<http://technet.microsoft.com/en-us/magazine/2007.06.cableguy.aspx>>, 2008, 2 pages.

"Secure Socket Tunneling Protocol", retrieved at <<http://en.wikipedia.org/wiki/SSTP>>, 2 pages, Feb. 26, 2009.

\* cited by examiner

REDIRECTION OF SECURE DATA CONNECTION REQUESTS

BACKGROUND

Remote connections between a client device and a secure network are commonplace today. For example, an employee with a client device (e.g., a laptop computer), located outside of a corporate office may establish a remote connection with the corporate network in order to access protected files and data.

Large systems typically include more than one entry point into the secure network. For a particular client, one entry point may be more appropriate than another entry point, depending on different parameters such as the location of the client. For example, when a secure network has multiple entry points, a particular entry point may be more appropriate for a particular client than another entry point. In such situations, if a client is configured to connect to the secure network via an inappropriate entry point, the client may need to be manually reconfigured to connect to the secure network via a more appropriate entry point. When the client subsequently moves to another location, a different entry point may become more appropriate, and the client would once again need to be manually reconfigured.

SUMMARY

A method of processing a secure data connection request identifying a target party within a secure data network is disclosed. The target party can be a target server, a client computer, or other computing device. Per the method, a client attempts to initiate a secure data connection to a target server via a first gateway. The first gateway applies logic to determine whether there is an alternate gateway (e.g., a second gateway) that the client should use to connect to the target server. The second gateway may be a more appropriate entry point with respect to the client than the first gateway. When the second gateway is determined to be more appropriate or an otherwise preferred entry point, the first gateway redirects the client to initiate a connection request to the second gateway. The determination of whether a client connection request should be redirected from the first gateway to the second gateway may occur automatically each time the client attempts to connect to the target server. Upon being redirected, the client may establish a connection to the target server via the second gateway.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes receiving a first secure data connection request from a client device at a first gateway. The first secure data connection request identifies a target server. The method includes sending a redirect message from the first gateway to the client device instructing the client device to send a second secure data connection request to an alternate gateway (e.g., a second gateway), such that the client device initiates a secure data connection to the target server via the second gateway.

In another particular embodiment, a system is disclosed that includes a server accessible by a client device using a secure data connection via a gateway. The system includes a plurality of gateways. Each gateway is capable of receiving a secure data connection request from the client device. Each gateway is also capable of communicating with at least one other gateway. Each gateway is capable of sending a redirect message to the client device instructing the client device to send a secure data connection request to a different gateway. Each gateway is also capable of facilitating a secure data connection between the client device and the target server either directly or via the different gateway.

In another particular embodiment, a computer-readable medium is disclosed. The computer-readable medium includes instructions, that when executed by a computer, cause the computer to receive a first Hypertext Transfer Protocol Secure (HTTPS) connection request from a client device at a first gateway. The first HTTPS connection request identifies a target server. The computer-readable medium also includes instructions, that when executed by the computer, cause the computer to send an HTTP redirect message from the first gateway to the client device instructing the client device to send a second HTTPS connection request to a second gateway. The HTTP redirect message specifies an address of the second gateway such that a connection is initiated between the client device and the target server via the second gateway. In a particular embodiment, the first gateway is a virtual private network (VPN) gateway and the second gateway is a VPN gateway. Other connection technologies that use an HTTPS transport mechanism may also be used.

Figure 1:
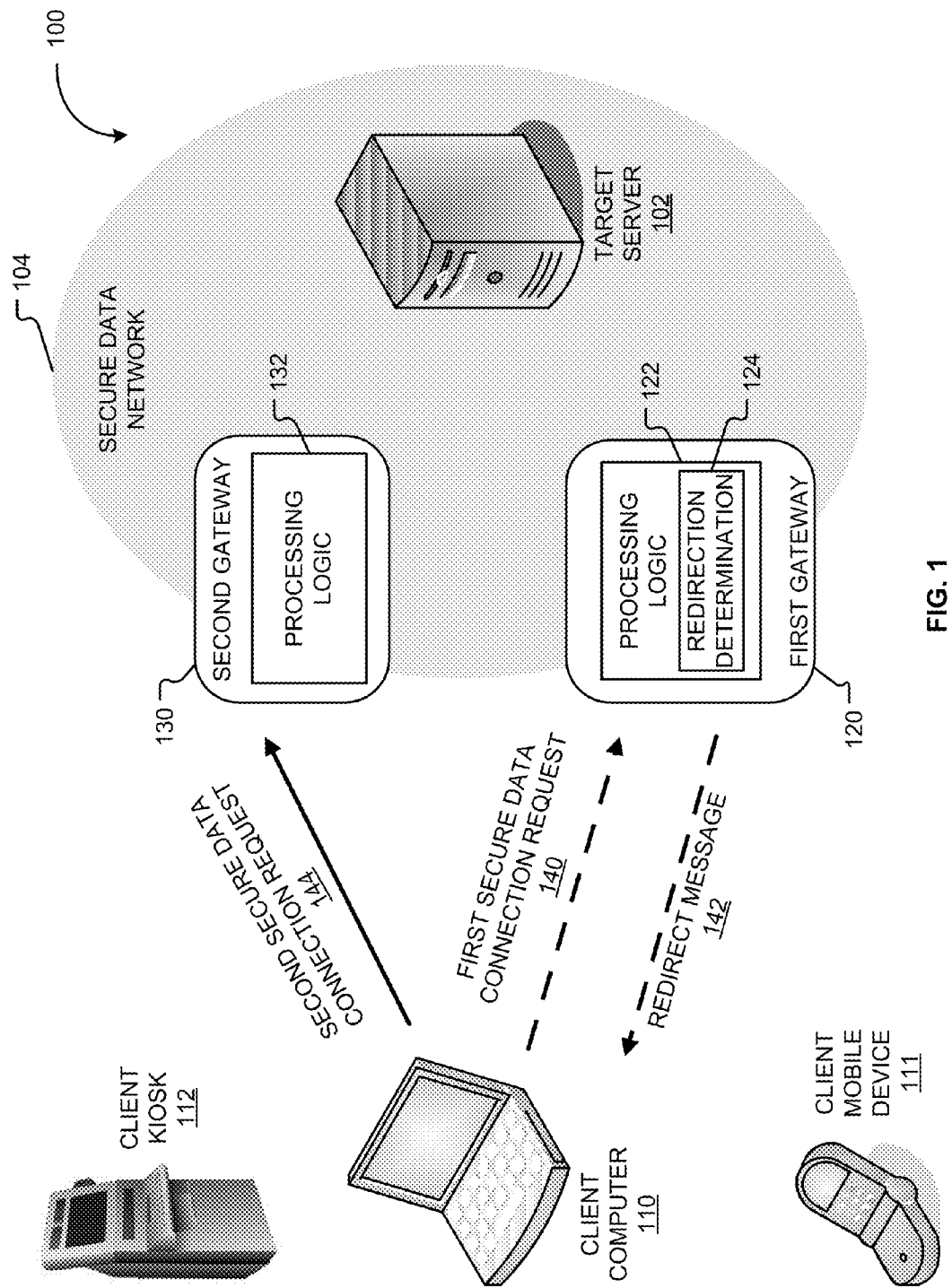
FIG. 1 is a diagram of a particular embodiment of a system supporting secure data connection with client connection redirection via a gateway.

FIG. 1 is a diagram of a particular embodiment of a system 100 supporting secure data connection with client connection redirection via a gateway. The system 100 includes a target server 102 residing within a secure data network 104, such as a firewall protected data network. The system includes a plurality of gateways. In the embodiment illustrated, the plurality of gateways includes a first gateway 120 and a second gateway 130. The first gateway 120 and the second gateway 130 are representative gateways depicted for illustration purposes. Client devices, such as a client computer 110, a client mobile device 111, and a client kiosk 112 can send secure data connection requests identifying the target server 102 to any of the plurality of gateways.

For example, to request a secure data connection to the target server 102, the client computer 110 sends a first secure data connection request 140 to the first gateway 120. The first secure data connection request 140 identifies the target server 102. For example, the first secure data connection request 140 may identify the target server 102 by specifying an IP address associated with the target server 102. The first gateway 120 includes processing logic 122 that includes redirect determination logic 124. Upon receiving the first secure data connection request 140 at the first gateway 120, the redirect determination logic 124 determines that the client computer 110 is to be instructed to attempt a secure data connection via the second gateway 130. For example, it may be determined that the second gateway 130 is more preferred than the first gateway 120 with respect to the client computer 110 because the second gateway 130 is located closer to the client computer 110 or because the second gateway 130 is not as busy as the first gateway 120. As a result, the first gateway 130 sends a redirect message 142 to the client computer 110. The redirect message 142 contains instructions that direct the client computer 110 to send a second secure data connection request 144 to the second gateway 130. Upon receiving the redirect message 142, the client computer 110 sends the second secure data connection request 144 to the second gateway 130. The second gateway 130 includes processing logic 132 that establishes a secure data connection between the client computer 110 and the target server 102 via the second gateway 130. It should be noted that the embodiment of FIG. 1, wherein the client computer 110 connects to the target server 102 after one redirection, is illustrative and not limiting. In a particular embodiment, the client computer 110 may be directed more than once before connecting to the target server 102.

Secure data connection requests, such as the first secure data connection request 140 and the second secure data connection request 144, may be transmitted using a secure protocol. Examples of secure protocols include Hypertext Transfer Protocol Secure (HTTPS) and Secure Socket Tunneling Protocol (SSTP). Another transport mechanism, such as Internet Protocol Version 6 (IPv6-HTTPS) may also be deployed. The first secure data connection request 140 and the second secure data connection request 144 need not be transmitted using the same secure protocol. For example, the first secure data connection request 140 may be transmitted over HTTPS and the second secure data connection request 144 may be transmitted over SSTP. Redirect messages, such as the redirect message 142 from the first gateway 120, may be transmitted over an unencrypted protocol such as Hypertext Transfer Protocol (HTTP).

Secure data connections between client devices and the target server 102 may be established using a secure networking framework. An illustrative secure networking framework implementation is virtual private networking (VPN). Various implementations of VPN may be used, such as Secure Socket Layer based VPN (SSL-VPN), Internet Protocol Security (IPSec) based VPN, OpenVPN, and Point-to-Point Tunneling Protocol based VPN (PPTP-VPN).

The redirect message 142 and the second secure data connection request 144 are both sent and received automatically, i.e. without needing any user action at the client computer 110. As such, no manual reconfiguration of the client computer 110 is required to send a secure data connection request to the second gateway 130 instead of the first gateway 120. It will thus be appreciated that the system of FIG. 1 provides for the automatic redirection of client device secure data connection requests from one gateway to another without manual reconfiguration of the client device, thereby reducing the time and effort required by a client device to establish a secure data connection. It will also be noted that although the system of FIG. 1 illustrates secure data connections with a target server in a secure data network, the system of FIG. 1 may also support secure peer-to-peer data connections between a client computer outside the secure data network and a client computer inside the secure data network.

Further, it should be noted that although the system of FIG. 1 illustrates a secure data connection with one location in a secure data network, i.e. the target server 102 in the secure data network 104, the system of FIG. 1 may also be used to establish secure data connections with more than one target computing device in a secure data network. For example, after the client computer 110 has established a first secure data connection with the target server 102 via the second gateway 130, as described above, the client computer 110 may attempt to establish a second secure data connection with a second target server (not shown) in the secure data network 104 while maintaining the first secure data connection. In this example, the client computer 110 may attempt to establish the second secure data connection via the second gateway 130, the second gateway 130 may redirect the client computer 110 to the first gateway 120, and the client computer 110 may establish the second secure data connection to the second target server via the first gateway 120. In a particular embodiment, the second gateway 130 may redirect the client computer 110 to the first gateway 120 to achieve load balancing or for other purposes. It will thus be appreciated that the system of FIG. 1 supports establishing multiple secure data connections between the same client computer and one or more target devices in the same secure data network.

Figure 2:
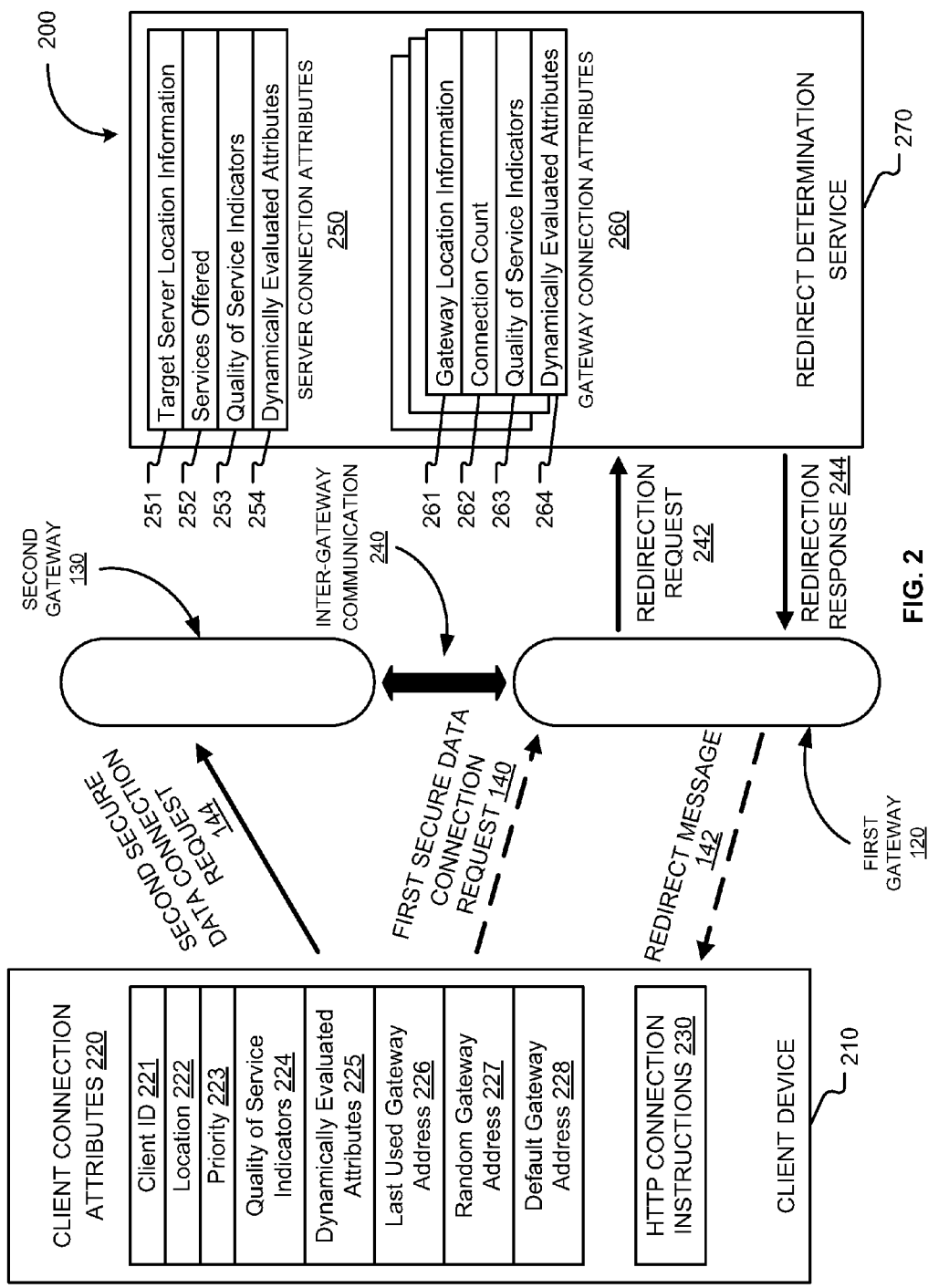
FIG. 2 is a block diagram of another particular embodiment of a system supporting secure data connection with client redirection that utilizes a redirect determination service.

FIG. 2 is a block diagram of another particular embodiment of a system 200 supporting secure data connection with client redirection that utilizes a redirect determination service. In a particular embodiment, the system of FIG. 2 may include many of the same or similar features as were discussed with reference to FIG. 1. Accordingly, to simplify the discussion of FIG. 2, features that may be the same or similar between the system illustrated in FIG. 1 and the system illustrated in FIG. 2 have been given the same reference numeral.

The system 200 of FIG. 2 includes a client device 210 that is capable of sending secure data connection requests to a plurality of gateways. For example, in the embodiment illustrated in FIG. 2, the plurality of gateways includes the first gateway 120 and the second gateway 130. Each gateway is capable of communicating with at least one other gateway. For example, in FIG. 2, the first gateway 120 and the second gateway 130 are capable of inter-gateway communication 240. Each gateway is also capable of communicating with a redirect determination service 270.

The client device 210 includes client connection attributes 220 and HTTP connection instructions 230. In a particular embodiment, the client connection attributes 220 and the HTTP connection instructions 230 may be located at a memory of the client device. In another particular embodiment, the client device 210 may be a computer, such as the client computer 110 of FIG. 1, a mobile device, such as the client mobile device 111 of FIG. 1, or a kiosk, such as the client kiosk 112 of FIG. 1. Client connection attributes may include a client identifier (ID) 221 for the client device 210, a location 222 of the client device 210, a priority level 223 of the client device 210, one or more quality of service indicators 224 related to the client device 210, and one or more dynamically evaluated attributes 225 related to the client device 210, among other alternatives. Client connection attributes 220 may also include an address of a last used gateway 226 to establish a secure data connection, a random gateway address 227, and a default gateway address 228 assigned to the client device 210. In a particular embodiment, the client connection attributes 220 may include a last used gateway 226 for each local network the client device 210 has connected to. That is, the client connection attributes 220 may include the address of a last used gateway 226 for each network the client device 210 has accessed. For example, when the client device 210 is a mobile device that has connected to a secure data network from a home network, a coffee shop network, and an airport network, the client connection attributes 220 may include a last used gateway 226 for each of the home network, the coffee shop network, and the airport network. The client connection attributes 220 may be used to determine where to send a secure data connection request, such as the first secure data connection request 140 of FIG. 1 or the second secure data connection request 144 of FIG. 1. For example, the client device 210 may send a secure data request to one of the gateway addresses included in the client connection attributes 220. One or more client connection attributes 220 may also be included within a secure data connection request, such as the first secure data connection request 140 of FIG. 1 or the second secure data connection request 144 of FIG. 1. One or more client connection attributes 220 may also be included in a redirect message, such as the redirect message 142 of FIG. 1.

The client ID 221 may include a unique identifier or device nickname associated with the client device 210. The client ID 221 may also include identification information related to one or more users associated with the client device 210. The location information 222 may include an IP address of the client device 210, information regarding the geographic location of the client device 210, and other routing information related to the client device 210. The quality of service indicators 224 related to the client device 210 may include one or more performance metrics associated with the performance of the client device 210, such as transaction latency and data throughput. The dynamically evaluated attributes 225 related to the client device 210 may include one or more attributes associated with the client device 210 that may change with time and may be reevaluated each time they are used by the client device 210. Examples of dynamically evaluated attributes 225 include a list of gateways within the secure data network that are available for the client device to connect to and gateways that are not available.

The redirect determination service 270 may be located at a particular gateway, at a target server, such as the target server 102 of FIG. 1, at a web server accessible to a gateway via a secure connection, or at any server within the secure data network 104. The redirect determination service 270 may include server connection attributes 250 for one or more servers and may include gateway connection attributes 260 for each of the plurality of gateways. The server connection attributes 250 may include target server location information 251, information regarding services offered 252 at the target server 102, one or more quality of service indicators 253 related to the target server 102, and one or more dynamically evaluated attributes 254 related to the target server 102.

The target server location information 251 may include an IP address of the target server 102, information regarding the geographic location of the target server 102, and other routing information related to the target server 102. The quality of service indicators 253 related to the target server 102 may include one or more performance metrics associated with the performance of the target server 102, such as transaction latency and data throughput. The dynamically evaluated attributes 254 related to the target server 102 may include one or more attributes associated with the target server 102 that may change with time and may be reevaluated each time they are used by the redirect determination service 270. Examples of dynamically evaluated attributes 254 include gateways within the secure data network that are available to facilitate connections to the target server 102 and gateways that are not available to facilitate connections to the target server 102.

For a particular gateway, such as the first gateway 120 or the second gateway 130, the gateway connection attributes 260 for the particular gateway may include gateway location information 261 for the particular gateway, a connection count 262 for the particular gateway, one or more quality of service indicators 263 related to the particular gateway, and one or more dynamically evaluated attributes 264 related to the particular gateway.

The gateway location information 261 for a particular gateway may include an IP address of the gateway, information regarding the geographic location of the gateway, and other routing information related to the gateway. The connection count 262 for a particular gateway may include a total number of concurrent connections supported by the gateway or a total number of unique client devices supported by the gateway. For example, if at a certain point in time the particular gateway is facilitating five secure data connections, then the connection count 262 for the particular gateway at that point in time is five. The quality of service indicators 263 related to a particular gateway may include one or more performance metrics associated with the performance of the gateway, such as transaction latency and data throughput. The dynamically evaluated attributes 264 related to the particular gateway may include one or more attributes associated with the particular gateway that may change with time and may be reevaluated each time they are used by the redirect determination service 270. One example of a dynamically evaluated attribute 264 is a status of the particular gateway, such as whether the gateway has temporarily been taken offline.

In operation, the client device 210 sends a first secure data connection request 140 to the first gateway 120. The first secure data connection request 140 may identify the target server 102. The gateway that receives the first secure data connection request 140 may be selected at the client device 210 based on the client connection attributes 220, such as the last used gateway address 226, the random gateway address 227, or the default gateway address 228.

As discussed above, the first gateway 120 is capable of inter-gateway communication 240 with the second gateway 130 and communication with the redirect determination service 270. The first gateway 120 utilizes one or both of these communication options to determine whether to redirect the client device 210. In the embodiment of FIG. 2, the first gateway 120 communicates with the redirect determination service 270 upon receiving the first secure data connection request 140. The first gateway 120 sends a redirection request 242 to the redirect determination service 270. The redirect termination service 270 then sends a redirection response 244 back to the first gateway 120. The redirect determination service 270 may determine that the client device 210 should be redirected to an alternate gateway (e.g. the second gateway 130) based on at least one of the server connection attributes 250, the gateway connection attributes 260, or a combination thereof. In a particular embodiment, when one or more client connection attributes 220 are included within the first secure data connection request 140, the one or more client connection attributes 220 included may also be used by the redirect determination service 270 in selecting which gateway to redirect the client device 210 to. In the example of FIG. 2, the redirect determination service 270 sends the redirection response 244 specifying that the client device 210 should be redirected to the second gateway 130. Alternatively, if the redirect determination service 270 determines that the client device 210 should not be redirected, then the redirection response 244 may specify that no redirection of the client device 210 is needed.

Upon receiving the redirection response 244, the first gateway 120 sends a redirect message 142 to the client device 210. The redirect message 142 contains instructions directing the client device 210 to send a second secure data connection request 144 to the second gateway 130. In response to receiving the redirect message 142, the client device 210 sends the second secure data connection request 144 identifying the target server 102 to the second gateway 130. The second gateway 130 establishes a secure data connection between the client device 210 and the target server 102 via the second gateway 130. Upon establishing the connection via the second gateway 130, the client device 210 may optionally store the address of the second gateway 130 in the client connection attributes 220 as the last used gateway address 226. The client device 210 may then send subsequent secure data connection requests to the gateway specified by the last used gateway address 226.

It will be appreciated that in a particular embodiment of the system of FIG. 2, the responsibility for determining where the client device 210 should be redirected is not confined to a particular location. Instead, the redirect determination service 270 may be located at various locations. It will be appreciated that by using the server connection attributes 250 and the gateway connection attributes 260 in deciding where to redirect client connection requests, the redirect determination service 270 may perform connection load balancing across the gateways to a secure network. It will also be appreciated that in a particular embodiment of the system of FIG. 2, the redirection determination can be made without using the redirect determination service 270, e.g. based on the inter-gateway communication 240. For example, if during inter-gateway communication 240, the first gateway 120 is notified by the second gateway 130 that the second gateway 130 is a more appropriate gateway for the client device 210, then the first gateway 120 may send the redirect message 142 instructing the client device 210 to send a secure data connection request to the second gateway 130 without communicating with the redirect determination service 270. For example, the first gateway 120 may determine during the inter-gateway communication 240 that it is currently supporting a greater number of connections than the second gateway 130, and the first gateway 120 may instruct the client device 210 to send a secure data connection request to the second gateway 130 based on this determination. It will thus be appreciated that the system of FIG. 2 provides for the automatic redirection of client device data connection requests from one gateway to another without manual reconfiguration of the client device, thereby reducing the time and effort required by the user of a client device to establish a secure data connection.

Figure 3:
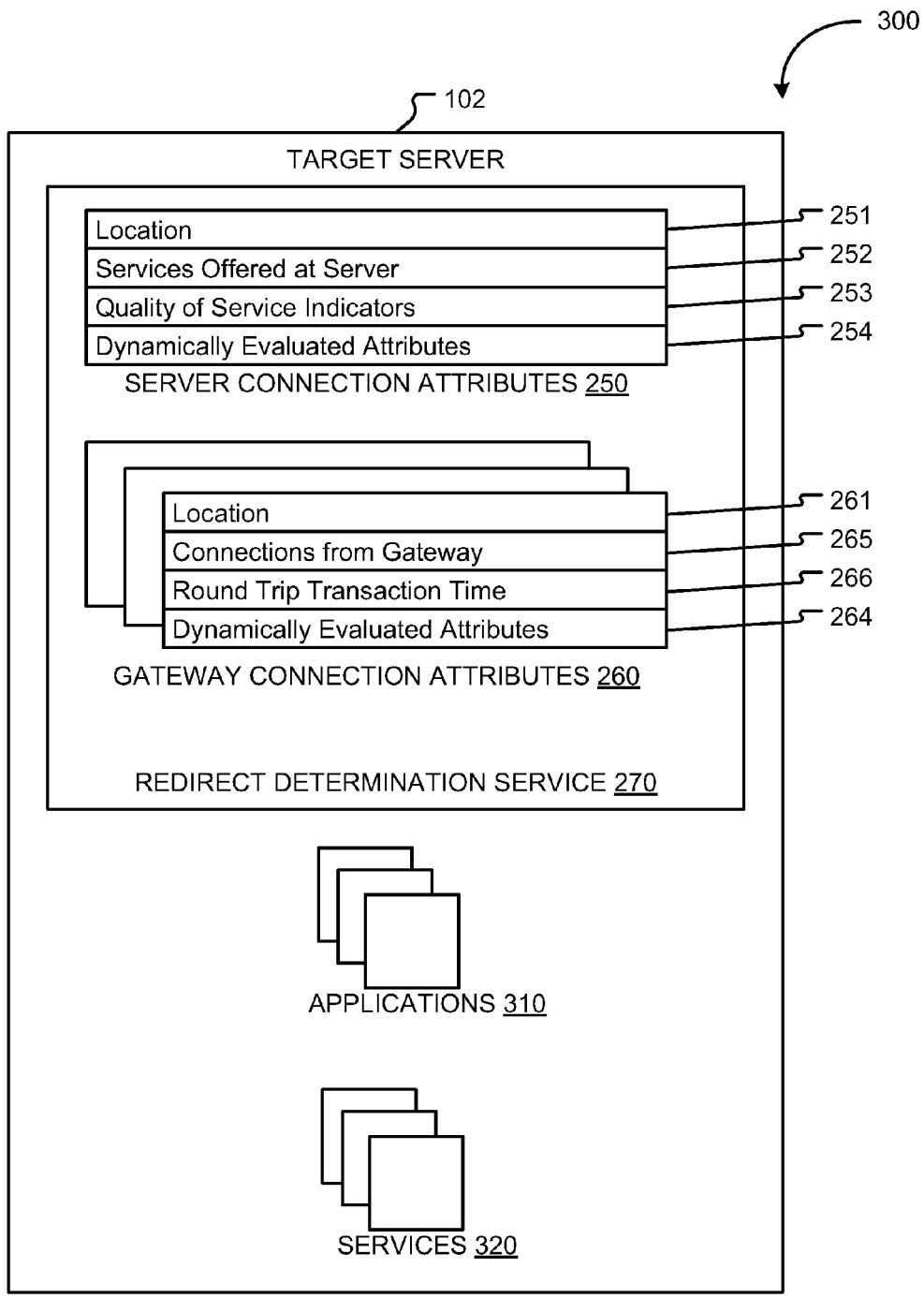
FIG. 3 is a block diagram of a particular embodiment of a target server that is accessible by a client via a gateway of the system of FIG. 1 or FIG. 2.

FIG. 3 is a block diagram 300 of a particular embodiment of a target system, such as a server, a client, or another computing device that is accessible by a client via a gateway of the system of FIG. 1 or FIG. 2. In an illustrative embodiment where the target system is a server, the target server 102 allows access to applications 310 and services 320 that run on the target server 102. In a particular embodiment, one of the services 320 that runs on the target server 102 is the redirect determination service 270. The redirect determination service 270 includes server connection attributes 250 related to the target server 102 as well as one or more gateway connection attributes 260 for each gateway that is capable of establishing a secure data connection between a client device and the target server 102.

The server connection attributes 250 may include a location 251 of the target server 102, services offered 252 at the target server 102, one or more quality of service indicators 253 related to the target server 102, and one or more dynamically evaluated attributes 254 related to the target server 102. One or more of the server connection attributes 250 may be measured at the target server 102. For example, the target server 102 may include processing logic to periodically evaluate and update one or more of the server connection attributes 250.

The redirect determination service 270 also includes gateway connection attributes 260 for each gateway capable of establishing a secure data connection between a client device and the target server 102.

For each particular gateway, the gateway connection attributes 260 may include a location 261 of the particular gateway, a number of connections 265 between the gateway and the target server 102, a round trip transaction time 266 between the particular gateway and the target server, and one or more dynamically evaluated attributes 264 related to the particular gateway. One or more of the gateway connection attributes 260 may be measured at the target server 102.

The number of connections 265 from the gateway to the target server 102 may include a total number of concurrent connections to the target server 102 supported by the gateway or a total number of unique client devices connected to the target server 102 supported by the gateway. For example, if at a certain point in time the particular gateway is facilitating five secure data connections with the target server 102, then the number of connections 265 between the gateway and the target server 102 at that point in time is five. The round trip transaction time 266 between a particular gateway and the target server 102 may include the time it takes a message to travel from the target server 102 to the gateway and then back to the target server 102.

The redirect determination service 270 may identify which gateway to redirect a client device to based on at least one of the server connection attributes 250, the gateway connection attributes 260, or any combination thereof. The redirect determination service 270 may also identify which gateway to redirect a client device to based on a comparison of the gateway connection attributes 260 for two different gateways. By way of example, and not limitation, such comparisons include comparing the number of connections 265 between two gateways and the target server 102 and comparing the round trip transaction time 266 for two gateways, such as the first gateway 120 and second gateway 130 of FIG. 1 and FIG. 2.

It will be appreciated that the target server 102 of FIG. 3 provides for the ability to localize all of the necessary redirection information, such as the server connection attributes 250 and the gateway connection attributes 260, in one place. Accordingly, gateways coupled with the target server 102 of FIG. 3 do not each need to include their own redirect determination logic. This simplifies the processing logic located at each gateway and avoids having to replicate the necessary redirection information at each gateway. As mentioned previously, however, the redirect determination service 270 may be located outside the target server 102 in another embodiment. For example, the redirect determination service may be located at each gateway. It will also be appreciated that the target server 102 may provide a single location for clients to connect to when they desire a particular application or service, such as one of the applications 310 or services 320 provided by the target server 102. For example, the target server 102 may provide applications such as file sharing applications and database applications and services such as e-mail services and printing services.

Figure 4:
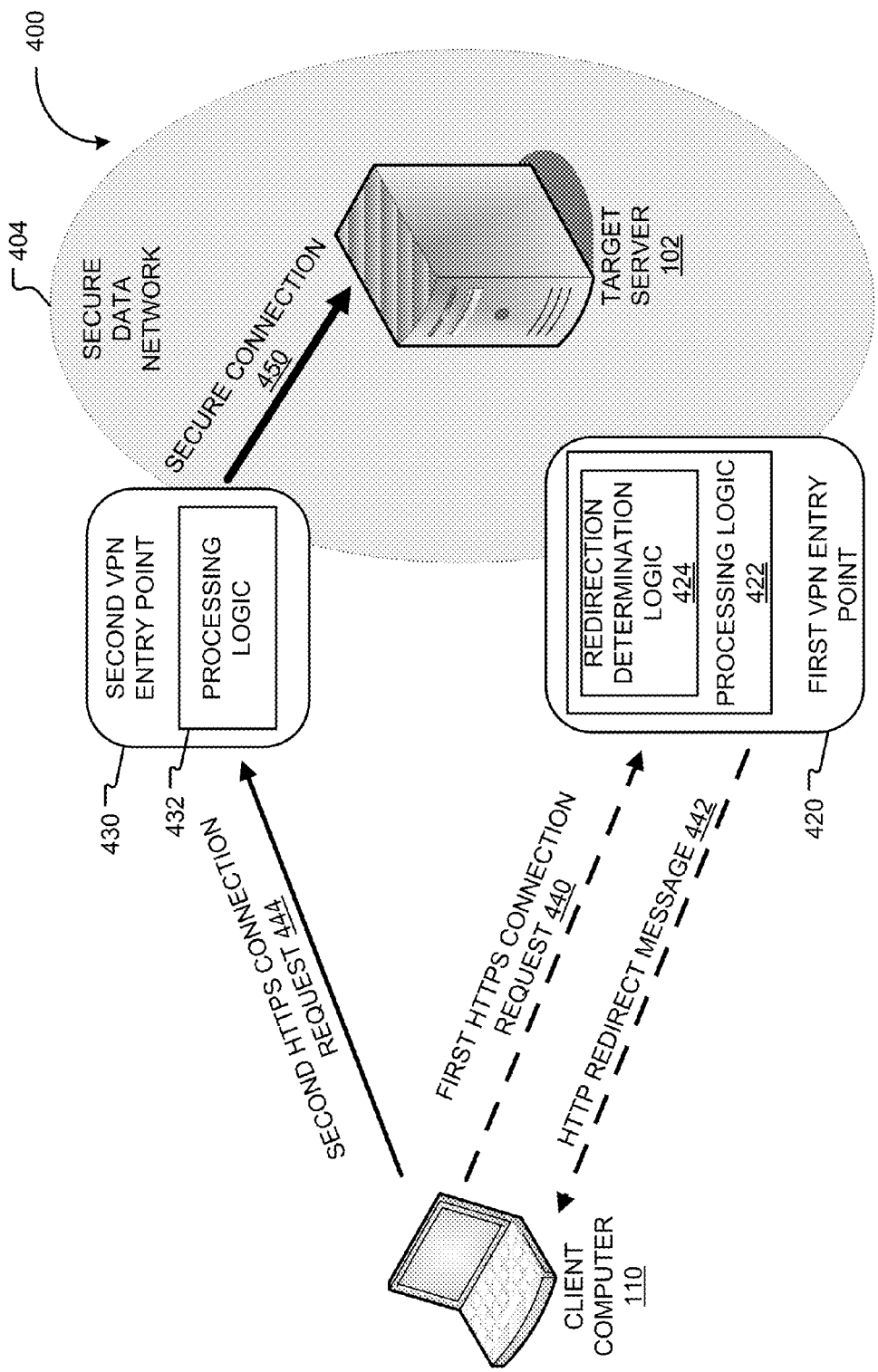
FIG. 4 is a diagram of a particular embodiment of a system supporting secure connection with client redirection via a VPN entry point.

FIG. 4 is a diagram of a particular embodiment of a system 400 supporting secure connection with client redirection via a VPN entry point. The system 400 includes a target server 102 that resides within a secure data network 404, such as a firewall protected corporate network. A plurality of virtual private network (VPN) entry points, including a first VPN entry point 420 and a second VPN entry point 430, are also located within the secure data network 404. Client devices, such as the client computer 110, can send HTTPS connection requests identifying the target server 102 to any of the plurality of VPN entry points.

VPN entry points, such as the first VPN entry point 420 and the second VPN entry point 430, are capable of providing a plurality of support services and functionality to connected client devices. By way of example, and not limitation, such support services and functionality include support for multiple connections to a particular server in the data network, single sign-on functionality, a customized portal page for each client device or each user that connects to the VPN entry point, file uploading and downloading restrictions, file modification restrictions, and application access restrictions. It should be noted that although the embodiment of FIG. 4 illustrates VPN entry points, this should not be deemed limiting. Rather, the system 400 of FIG. 4 may be used in any networking scenario where HTTPS is used as a transport mechanism.

To request a secure connection, the client computer 110 sends a first HTTPS connection request 440 to the first VPN entry point 420 identifying the target server 102. The first VPN entry point 420 includes processing logic 422, including redirect determination logic 424. Upon receiving the first HTTPS connection request 440, the redirect determination logic 424 determines that the client computer 110 should be instructed to attempt a secure connection via the second VPN entry point 430. The first VPN entry point 420 sends an HTTP redirect message 442 to the client computer 110. The HTTP redirect message 442 contains instructions to direct the client computer 110 to send a second HTTPS connection request 444 to the second VPN entry point 430. Upon receiving the HTTP redirect message 442, the client computer 110 sends the second HTTPS connection request 444 to the second VPN entry point 430. The second VPN entry point 430 includes processing logic 432 that establishes a secure connection 450 between the client computer 110 and the target server 102 via the second VPN entry point 430.

In a particular embodiment, the client computer 110 may not identify the target server 402 in the first HTTPS connection request 440, instead choosing to merely indicate that the client computer 110 desires a connection with the secure data network 404. In this embodiment, the first VPN entry point 420 may issue the HTTP redirect message 442 specifying the second gateway 430 even though no target server was identified in the first HTTPS connection request 440. Subsequently, when the client computer 110 attempts to communicate with the target server 402, the client computer 110 will know to attempt such communication via the second gateway 130, as a result of the HTTP redirect message 442.

It will be appreciated that the particular embodiment illustrated in FIG. 4 provides for the automatic redirection of client devices from one VPN entry point of a corporate network to another without having to manually reconfigure the client device, thereby reducing the time and effort required to establish a VPN connection. As such, the particular embodiment illustrated in FIG. 4 may be used by a corporation to provide its employees the ability to establish VPN connections with their corporate network via an appropriate VPN entry point without requiring its employees to manually reconfigure the VPN software on each of their individual client devices. Furthermore, it will be appreciated that the particular embodiment illustrated in FIG. 4 may be used to help ensure efficient connections between each connected client device outside a corporate network and each server inside the corporate network, resulting in reduced network latency and waiting times associated with network applications and services. In a particular embodiment where a client device has multiple preconfigured VPN connection options to choose from, the system of FIG. 4 may be used to inform the client device, via an HTTP redirect message, which of the preconfigured VPN connection options would provide an efficient connection with the corporate network.

Figure 5:
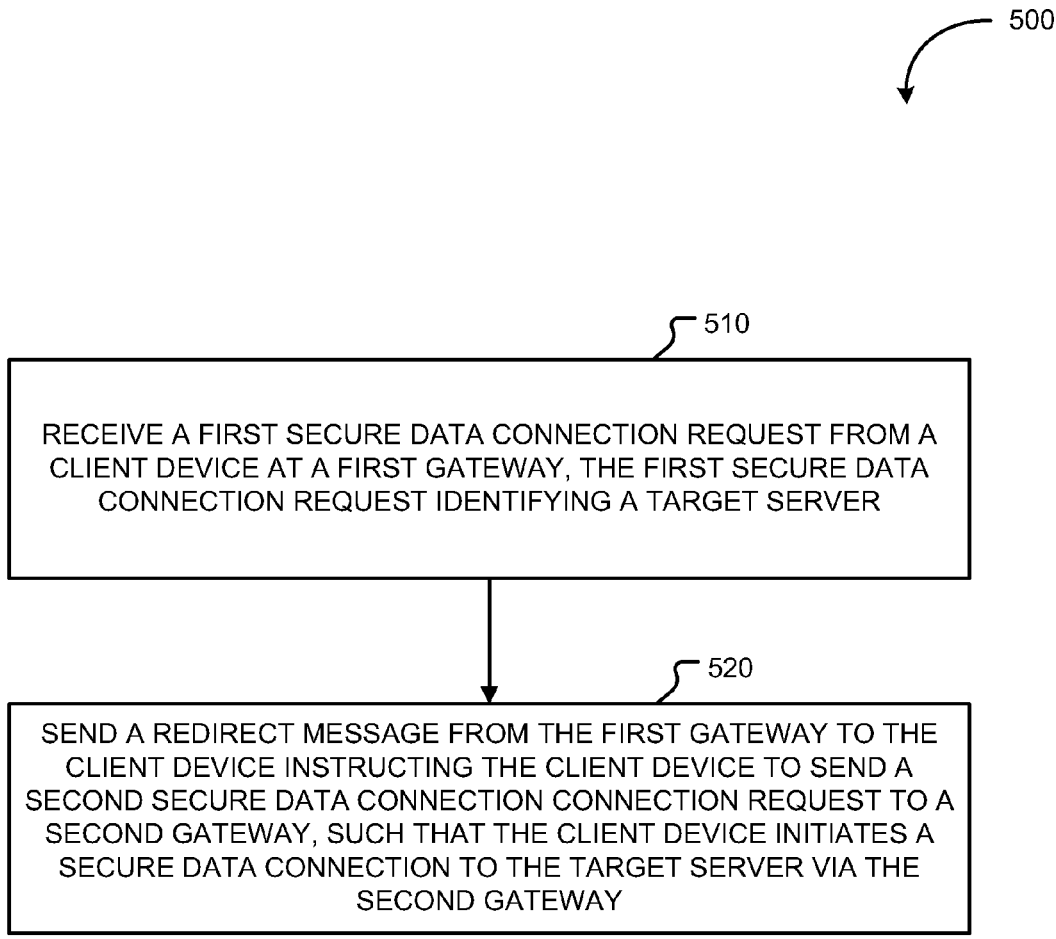
FIG. 5 is a flow diagram of a particular embodiment of a method of processing a secure data connection request.

FIG. 5 is a flow diagram of a particular embodiment of a method of processing a secure data connection request. The method includes receiving a first secure data connection request from a client device at a first gateway, at 510. For example, the first secure data connection request 140 of FIG. 1 from the client computer 110 of FIG. 1 may be received at the first gateway 120 of FIG. 1. The secure data connection request identifies a target server. For example, the secure data connection request may identify the target server 102 of FIG. 1. The method also includes sending a redirect message from the first gateway to the client device instructing the client device to send a second secure data connection request to a second gateway, at 520. For example, the redirect message 142 of FIG. 1 may be sent from the first gateway 120 of FIG. 1 to the client computer 110 of FIG. 1, instructing the client computer 110 of FIG. 1 to send the second secure data connection request 144 of FIG. 1 to the second gateway 130 of FIG. 1. The client device initiates a secure data connection to the target server via the second gateway. For example, the client computer 110 of FIG. 1 may initiate a secure data connection to the target server 102 of FIG. 1 via the second gateway 130 of FIG. 1.

Figure 6:
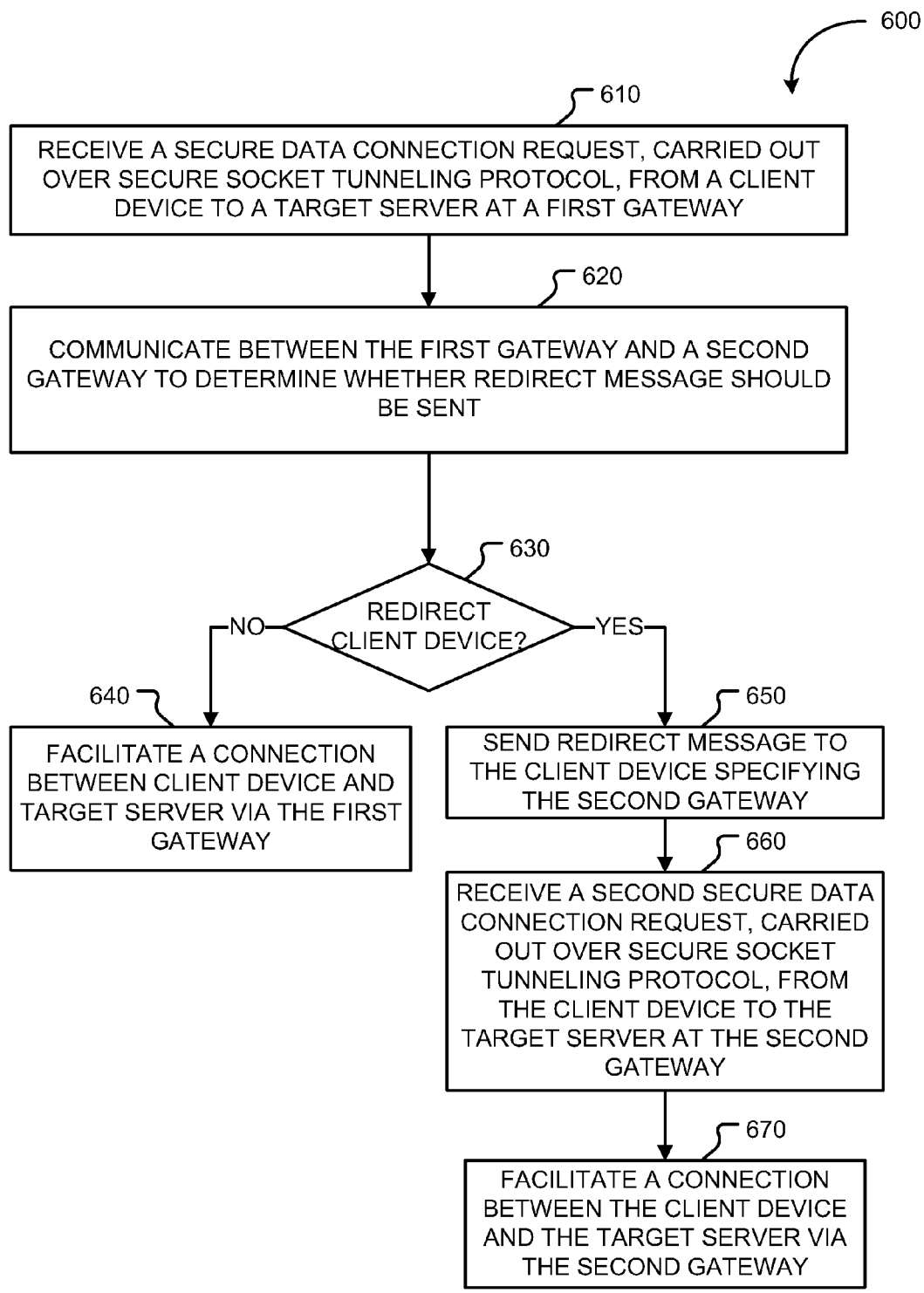
FIG. 6 is a flow diagram of another particular embodiment of a method of processing a secure data connection request.

FIG. 6 is a flow diagram of another particular embodiment of a method 600 of processing a secure data connection request. The method includes receiving a secure data connection request from a client device to a target server at a first gateway, at 610. The secure data connection request is carried out over a secure protocol, such as the Secure Socket Tunneling Protocol (SSTP). For example, a secure data connection request from the client computer 110 of FIG. 1 to the target server 102 of FIG. 1, carried out over SSTP, may be received at the first gateway 120 of FIG. 1. The method also includes communicating between the first gateway and a second gateway to determine whether or not a redirect message should be sent to the client device, at 620. For example, the second gateway may include the second gateway 130 of FIG. 1. The method also includes determining whether or not to redirect the client device, at 630. If the client device does not need redirection, the secure data connection is facilitated between the client device and the target server via the first gateway, at 640. If the client device is to be redirected, a redirect message is sent to the client device specifying the second gateway, at 650. Next, a second secure data connection request carried out over SSTP, from the client device to the target server, is received at the second gateway 660. For example, a second secure data connection request from the client computer 110 of FIG. 1 to the target server 102 of FIG. 1 may be received at the second gateway 130 of FIG. 1. A connection is then facilitated between the client device and the target server via the second gateway, at 670. For example, a connection may be facilitated between the client computer 110 of FIG. 1 and the target server 102 of FIG. 1 via the second gateway 130 of FIG. 1.

It will be appreciated that the method of FIG. 6 provides for the automatic redirection of client devices from one gateway of a secure data network to another gateway of the secure data network without manual reconfiguration of the client devices, thereby reducing the time and effort required by a user of a client device to establish a secure data connection.

Figure 7:
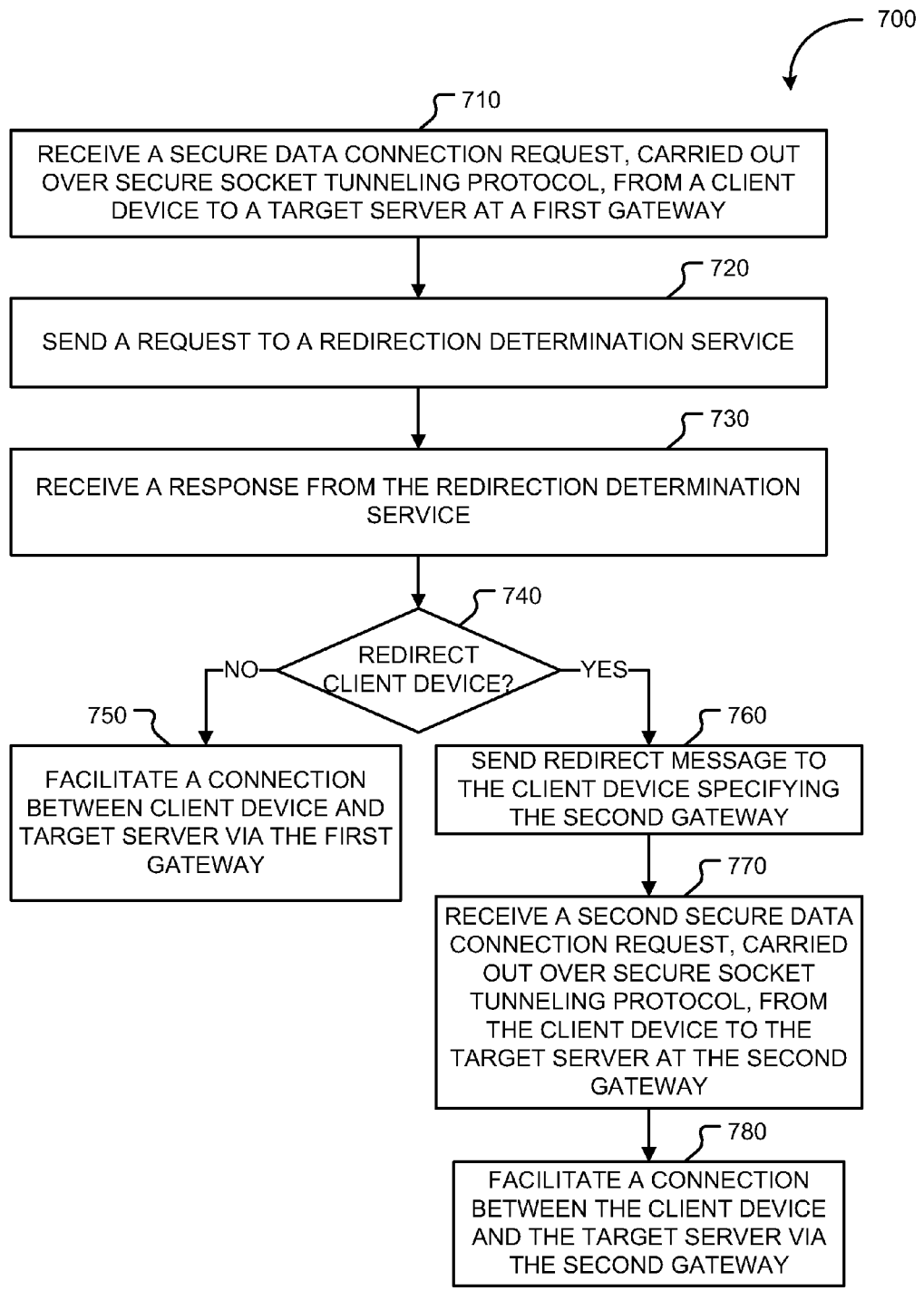
FIG. 7 is a flow diagram of another particular embodiment of a method of processing a secure data connection request.

FIG. 7 is a flow diagram of another particular embodiment of a method 700 of processing a secure data connection request. The method includes receiving a secure data connection request from a client device to a target server at a first gateway, at 710. The secure data connection request is carried out over a secure protocol, such as the Secure Socket Tunneling Protocol (SSTP). For example, a secure data connection request from the client computer 110 of FIG. 1 to the target server 102 of FIG. 1, carried out over SSTP, may be received at the first gateway 120 of FIG. 1. The method also includes sending a request from the first gateway to a redirect determination service, at 720, and receiving a response from the redirect determination service at the first gateway, at 730. For example, the redirect determination service may include the redirect determination service 270 of FIG. 2. The method also includes determining whether or not to redirect the client device, at 740. If the client device does not need redirection, the secure data connection is facilitated between the client device and the target server via the first gateway, at 750. If the client device should be redirected, a redirect message is sent to the client device specifying the second gateway, at 760. Next, a second secure data connection request from the client device to the target server is received at the second gateway 770. For example, a second secure data connection request from the client computer 110 of FIG. 1 to the target server 102 of FIG. 1, carried out over SSTP, may be received at the second gateway 130 of FIG. 1. A connection is then facilitated between the client device and the target server via the second gateway, at 780. For example, a connection may be facilitated between the client computer 110 of FIG. 1 and the target server 102 of FIG. 1 via the second gateway 130 of FIG. 1.

Figure 8:
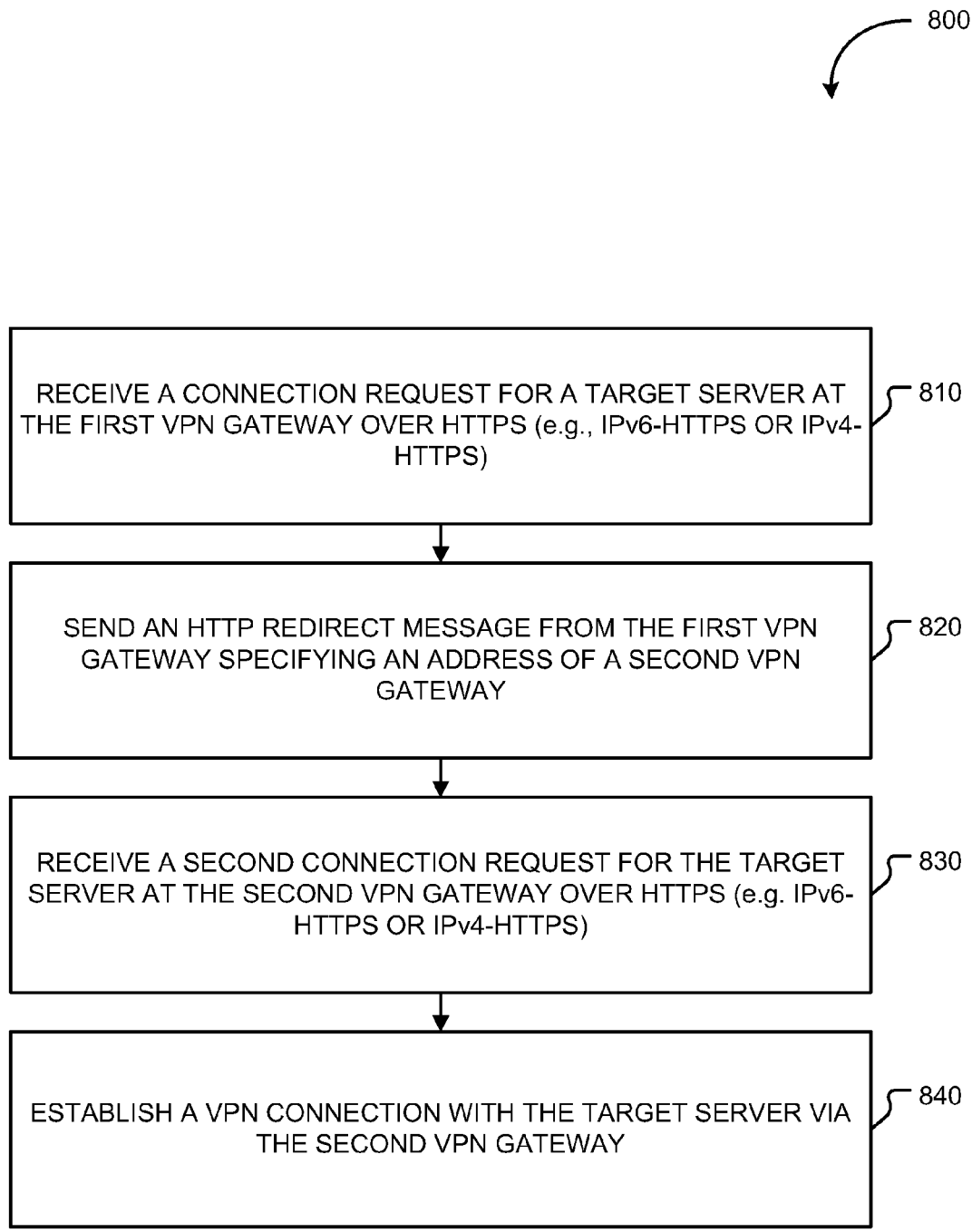
FIG. 8 is a flow diagram of another particular embodiment of a method of processing a secure data connection request.

FIG. 8 is a flow diagram of another particular embodiment of a method 800 of processing a secure data connection request. The method 800 includes receiving a connection request for a target server over HTTPS at a first VPN gateway, at 810. The HTTPS can be IPV6-HTTPS or IPV4-HTTPS. For example, a connection request for the target server 102 of FIG. 4 may be received at the first VPN entry point 420. Proceeding to 820, an HTTP redirect message is sent from the first VPN entry point to a client device. The redirect message specifies the address of the second VPN gateway, such as the second VPN entry point 430 of FIG. 4. Advancing to 830, a second connection request for the target server is received at the second VPN gateway. The second connection request is also carried out over HTTPS, which can be IPv6-HTTPS or IPv4-HTTPS. A VPN connection is established with the target server via the second VPN gateway, at 840.

The method of FIG. 8 provides for automatic HTTP redirection of client devices attempting to connect to a target server by sending an HTTPS connection request to a VPN gateway. As such, redirect messages may conveniently be sent over HTTP, while still maintaining the security of secure data connection requests that are sent over HTTPS. Redirect messages may be transmitted over HTTP because redirect messages include an address of a VPN gateway or other public information. In contrast, secure data connection requests may require increased security, since they may include private data, such as client location and password information.

Figure 9:
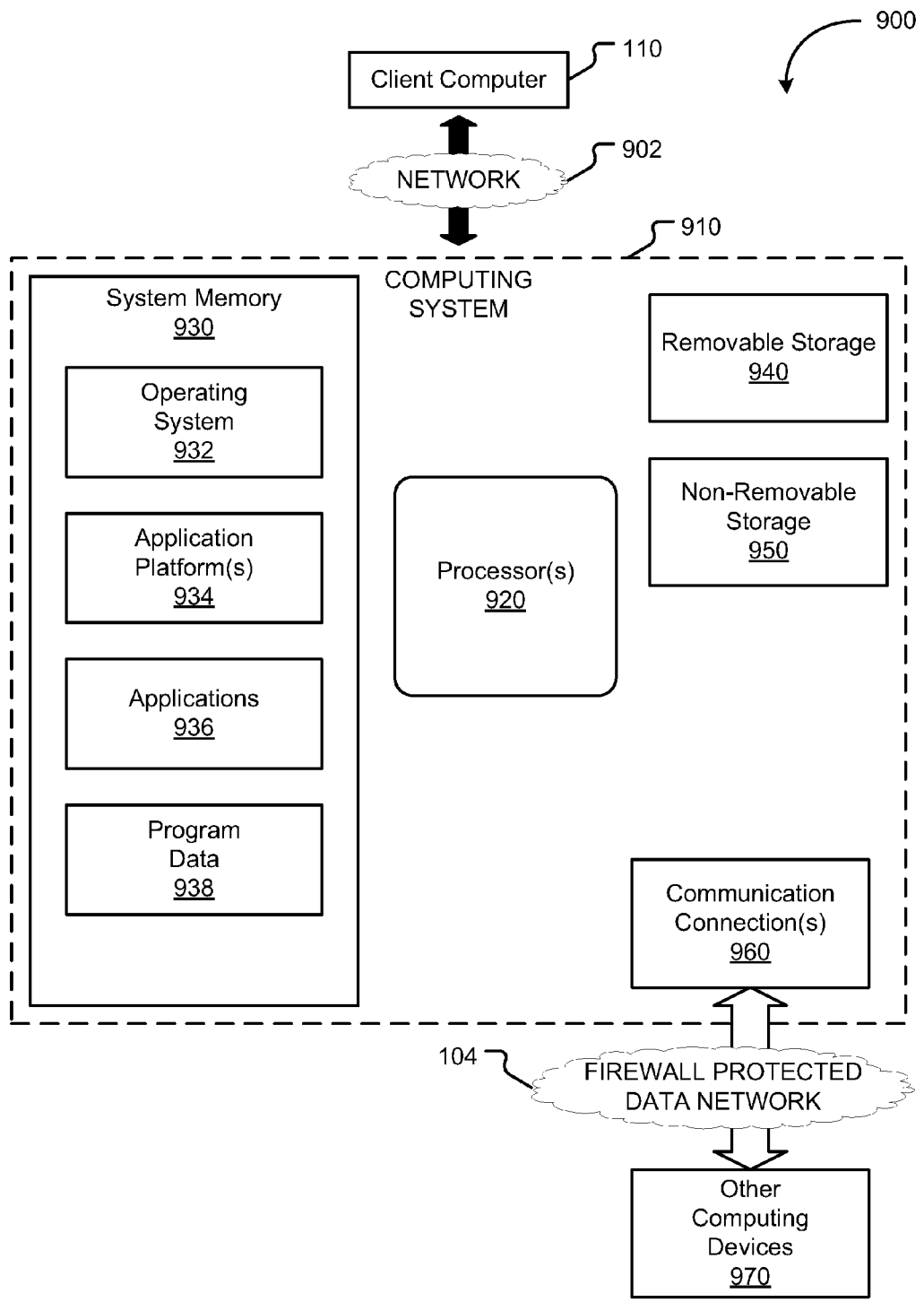
FIG. 9 is a block diagram of a computing environment operable to support embodiments of computer-implemented methods, computer program products, and computer system components as illustrated in FIGS. 1-8.

FIG. 9 shows a block diagram of a computing environment 900, including a computing system 910, operable to support embodiments of computer-implemented methods, computer program products, and system components according to the present disclosure. The computing system 910 is capable of communicating with client computers, such as the client computer 110 of FIG. 1 via a network 902.

The computing system 910 typically includes at least one processor 920 and system memory 930. Depending on the configuration and type of computing system, the system memory 930 may be volatile (such as random access memory or "RAM"), non-volatile (such as read-only memory or "ROM," flash memory, and similar memory devices that maintain the data they store even when power is not provided to them) or some combination of the two. The system memory 930 typically includes an operating system 932, one or more application platforms 934, one or more applications 936, and program data 938. In a particular embodiment, the redirect determination service 270 of FIG. 2 is implemented as processor-executable instructions saved as one of the applications 936 and may also include access to the program data 938.

The computing system 910 may also have additional features or functionality. For example, the computing system 910 may include removable and/or non-removable additional data storage devices, such as magnetic disks, optical disks, tape, and standard-sized or miniature flash memory cards. Such additional storage is illustrated in FIG. 9 by removable storage 940 and non-removable storage 950. Computer storage media may include volatile and/or non-volatile storage and removable and/or non-removable media implemented in any method or technology for storage of information such as computer-readable instructions, data structures, program components or other data. The system memory 930, the removable storage 940 and the non-removable storage 950 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store the desired information and which can be accessed by computing system 910. Any such computer storage media may be part of the computing system 910.

The computing system 910 also contains one or more communication connections 960 that allows the computing system to communicate with other computing devices 970, such as one or more computing systems or servers. For example, the computing system 910 may communicate with the other computing devices 970 over a secure data network. In a particular embodiment, the secure data network may include the secure data network 104 of FIG. 1. The computing system 910 may include the first gateway 120 of FIG. 1, and the other computing devices 970 may include the target server 102 of FIG. 1, the second gateway 130 of FIG. 1, or another gateway. Other components described in reference to FIGS. 1-4 may be implemented as the computing system 910, such as the target server 102 of FIG. 1 and FIG. 2.

The one or more communication connections 960 are an example of communication media. By way of example, and not limitation, communication media may include wired media such as a wired network or direct-wired connection and wireless media such as acoustic, RF, infrared and other wireless media. It will be appreciated, however, that not all of the components or devices illustrated in FIG. 9 or otherwise described in the previous paragraphs are necessary to support each particular embodiment or embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving a first secure data connection request from a client device at a first gateway, the first secure data connection request identifying a target server;
   sending a request from the first gateway to a redirect determination service and receiving a response from the redirect determination service, the response identifying a second gateway based on one or more server connection attributes and one or more gateway connection attributes; and
   sending a redirect message from the first gateway to the client device instructing the client device to send a second secure data connection request to the second gateway, such that the client device initiates a secure data connection to the target server via the second gateway, wherein the first gateway has a non-hierarchical relationship with the second gateway.

2. The method of claim 1, wherein at least one of the first secure data connection request and the second secure data connection request is carried out over a Hypertext Transfer Protocol Secure (HTTPS) connection.

3. The method of claim 2, wherein the HTTPS connection is one of an IPv6-HTTPS connection and an IPv4-HTTPS connection.

4. The method of claim 1, wherein the secure data connection is a Secure Socket Layer based Virtual Private Network (SSL-VPN) connection.

5. The method of claim 1, wherein at least one of the first secure data connection request and the second secure data connection request is carried out over a Secure Socket Tunneling Protocol (SSTP) connection.

6. The method of claim 1, wherein the client device is one of: a computer, a kiosk, and a mobile device.

7. The method of claim 1, wherein the redirect message is an HTTP redirect message.

8. The method of claim 1, wherein the second gateway is selected from a plurality of gateways based on at least one of: a location of the client device, a location of the target server, a unique identification of the client device, a type of service requested by the client device, and a priority level of the client device.

9. The method of claim 1, wherein the client device stores an address of the second gateway.

10. The method of claim 1, wherein the first gateway sends a request to a redirect determination service located at the target server and receives a response from the redirect determination service prior to sending the redirect message, wherein the response specifies the second gateway.

11. The method of claim 10, wherein the client device attempts to establish a second secure data connection with a second target server while maintaining the secure data connection to the target server.

12. The method of claim 11, wherein the redirect determination service identifies the second gateway at least partly based on a gateway connection attribute measured at the target server, the gateway connection attribute included in the redirect message.

13. The method of claim 12, wherein the gateway connection attribute is related to at least one of: a first count of a number of connections between the first gateway and the target server and a second count of a number of connections between the second gateway and the target server.

14. The method of claim 1, wherein the first gateway is a randomly selected gateway.

15. A system comprising:
a server accessible by a client device using a secure data connection via a gateway;
a plurality of gateways, wherein each gateway of the plurality of gateways is capable of:
receiving a secure data connection request from the client device;
sending a redirect message to the client device instructing the client device to send a second secure data connection request to a different gateway; and
facilitating a secure data connection between the client device and the server via the different gateway, wherein the gateway has a non-hierarchical relationship with the different gateway, and wherein facilitation of the secure data connection includes sending a request to a redirect determination service and receiving a response from the redirect determination service, the response identifying the different gateway based on one or more server connection attributes and one or more gateway connection attributes.

16. The system of claim 15, wherein each of the plurality of gateways is a virtual private network entry point to a firewall-protected data network within which the server is located, and wherein the redirect determination service is in the firewall-protected data network.

17. The system of claim 16, wherein the firewall-protected data network includes a corporate network, and wherein the server provides file sharing applications and database applications.

18. The system of claim 16, wherein each of the virtual private network entry points is further capable of providing at least one of support for single sign-on functionality, a customized portal page for the client device, file upload restrictions, file download restrictions, and file modification restrictions.

19. A computer-readable storage device comprising instructions, that when executed by a computer, cause the computer to:
receive a first Hypertext Transfer Protocol Secure (HTTPS) connection request from a client device at a first virtual private network (VPN) gateway; and
send an HTTP redirect message from the first VPN gateway to the client device instructing the client device to send a second HTTPS connection request to a second VPN gateway that has a non-hierarchical relationship with the first VPN gateway, such that a VPN connection is initiated between the client device and a target computing device via the second VPN gateway, wherein the first VPN gateway receives a response to a redirect determination query, wherein the res onse identifies the second VPN gateway and wherein the second VPN gateway is determined based on one or more server connection attributes and one or more gateway connection attributes.

20. The computer-readable storage device of claim 19, further comprising instructions, that when executed by the computer, cause the computer to communicate between the first VPN gateway and the second VPN gateway prior to sending the HTTP redirect message.

* * * * *